UNITED STATES PATENT OFFICE.

MONE R. ISAACS, OF PHILADELPHIA, PENNSYLVANIA.

METHOD OF TREATING LIME.

No. 843,277.     Specification of Letters Patent.     Patented Feb. 5, 1907.

Application filed April 25, 1906. Renewed January 16, 1907. Serial No. 352,520.

*To all whom it may concern:*

Be it known that I, MONE R. ISAACS, a citizen of the United States, and a resident of the city of Philadelphia, State of Pennsylvania, have invented certain new and useful Improvements in Methods of Treating Lime and Composition of Matter Produced Thereby, of which the following is a full, clear, and complete disclosure.

The object of my invention is to provide a method by which the setting properties of lime may be regulated according to the quality of the lime it is desired to produce; and my invention further consists in the composition of the matter produced in carrying out my improved method.

I have found that the addition of fluorids to lime retards the setting properties of the latter when prepared for use, and I employ the same in regulating the setting properties of lime, so that it will set either slow or quick, as desired, by varying the percentage of fluorids employed. I have also found sodium fluorid especially advantageous and, as far as I am informed, the most convenient and most suitable for the above purpose, and in practice I add to the lime from about two to thirty per cent. of fluorid, according to the quality of lime it is desired to produce—that is to say, the setting properties of such lime.

While I have found sodium fluorid to be especially advantageous and convenient and suitable for the above purpose, my invention is not confined to this particular fluorid, as any other soluble fluorid or compound of hydrofluoric acid may be used—for example, potassium fluorid or ammonium fluorid.

I have found that the composition of matter or, in other words, the lime prepared by this method is well adapted for use in making cement, plaster, calcium, water paints, glue, sizing, &c., and can also be used advantageously in preserving various matters subject to decay.

Having thus described my improved method and the composition of matter produced thereby, what I claim and desire to protect by Letters Patent of the United States, is—

1. The herein-described method of treating lime, which consists in combining the same with a fluorid.

2. The herein-described method of treating lime, which consists in combining the same with sodium fluorid.

3. The herein-described method of treating lime, which consists in combining therewith from about two to thirty per cent. of a fluorid.

4. A composition of matter consisting of lime, and a fluorid.

5. A composition of matter consisting of lime, and a sodium fluorid.

6. A composition of matter consisting of lime, and a fluorid, combined substantially in the proportion described.

In witness whereof I have hereunto set my hand this 24th day of April, A. D. 1906.

MONE R. ISAACS.

Witnesses:
HENRY COBB KENNEDY,
ALEXANDER PARK.